United States Patent Office 3,070,559
Patented Dec. 25, 1962

3,070,559
SILICONE RUBBER STOCKS
Siegfried Nitzsche and Manfred Wick, Burghausen, Upper Bavaria, Germany, assignors to Wacker-Chemie G.m.b.H., Munich, Bavaria, Germany
No Drawing. Filed Sept. 8, 1959, Ser. No. 838,443
Claims priority, application Germany Sept. 12, 1958
3 Claims. (Cl. 260—18)

This invention relates to novel silicone rubber stocks and methods of preparing silicone elastomers.

Silicone rubber, based on diorganopolysiloxane polymers, has been known for over a decade. This type of rubber has gained a firm foothold and is gaining an ever increasing market in industry.

To date two general methods have been employed for vulcanizing silicone rubber. The older and better known method involves the incorporation of an organic peroxide into the silicone rubber stock and vulcanization of the peroxide with heat. A similar heat vulcanization action is obtained with special siloxane polymers and sulfur but this is not yet in general use. The second general method involves the incorporation into the stock of cross linking agents such as methyl hydrogensiloxane, alkylorthosilicate or alkylpolysilicate and catalysts such as metal salts of organic acids, metal oxides and so forth. This system of cross linking agent and catalyst may bring about vulcanization of the silicone rubber stock at room temperature.

The use of organic peroxides and heat to vulcanize silicone rubber has not been entirely satisfactory because this system is not operative with many organic fillers and additives often employed in the rubber art. Furthermore, the peroxide vulcanized rubber may "coast" or continue to cure very slowly and thus harden and lose its rubberiness. The room temperature vulcanizing systems have, in fact, been better than the peroxide-heat systems in that the ultimate rubber may have better heat stability and rebound elasticity. Furthermore, the room temperature vulcanization is operative with low molecular weight siloxane polymers and can be employed with organic fillers and other additives.

It is quite apparent that despite any advantages achieved with room temperature vulcanizing systems for silicone rubber, there has been a practical problem in application because as soon as the cross linking agent and catalyst are introduced into the stock, vulcanization and curing will be initiated. The pot life and shelf life of these stocks have been such that it is necessary to ship and store the stocks as two component systems. The catalyst and cross linking agent are added to the polymer, filler and additives just prior to use. This requires the use of mills or other mixing devices and adds to the expense of such materials and complicates their use.

The primary object of this inventon is to produce a new silicone rubber stock capable of heat vulcanizing through the chemical action of room temperature vulcanizing systems. Another object is a single component silicone rubber system capable of curing at room temperature. Other objects and advantages of this invention are disclosed in or will be apparent from the disclosures and claims which follow.

This invention relates to silicone rubber stocks wherein the cross linking agents, the catalyst or both are absorbed in a porous aluminum silicate. The cross linking agent and catalyst are readily absorbed by the aluminum silicate which acts as a "molecular cage." The absorbed cross linking agent and catalyst are not displaced from the silicate by mixing with the siloxane polymer. Thus the cross linking agent and catalyst are deactivated by absorption in the aluminum silicate molecular cage and the aluminum silicate with absorbed agents can be thoroughly and evenly dispersed throughout the silicone rubber stock.

The silicone rubber stocks employed herein are based on organosiloxane polymers. The polymers of particular interest herein are of the general formula $XO[R_2SiO]_nX$ where each X is an alkyl radical or a hydrogren atom, each R is an alkyl radical, an aryl radical, an alkenyl radical, or a halogenated alkyl or halogenated aryl radical and $n$ has a value of at least 50. Such polymers can be described as difunctional diorganosiloxane polymers or alkoxy- or hydroxy-endblocked diorganosiloxane polymers. It is preferred that at least 80 percent of the R substituents be alkyl and particularly methyl and ethyl. However, the organic substituents can be methyl, ethyl, propyl, nonyl, octadecyl, phenyl, xenyl, vinyl, allyl, perchloromethyl, 3,3,3-trifluoropropyl, bromoethyl, chlorofluorophenyl, etc. Of particular interest because of commerical availability are the hydroxy endblocked dimethylpolysiloxane polymers. The operable polymers can vary from relatively thin fluids having viscosities of about 50 cs. at 25° C. to gumlike materials having viscosities measured in millions of cs. at 25° C. but remaining soluble in benzene and other organic solvents.

The fillers employed herein are very well known in the art. Operable as fillers are the various natural and manufactured silicas, carbon blacks, quartz flour, asbestos flour, mica flour, calcium carbonate, titanium dioxide, zinc oxide, magnesium oxide, iron oxide, glass frit, cork powder, sawdust and so forth. The filler is usually employed in amounts of from 20 to 200 parts by weight filler per 100 parts siloxane polymer.

Other additives which can be present in these stocks include oxidation inhibitors, compression set additives, pigments and other materials well known as additives in the silicone rubber art.

The curing system employed in this invention depends upon cross linking agents and catalysts. The cross linking agents employed can be tetraalkoxy- or tetraaryloxysilanes, condensation products of such silanes which are alkyl- and arylpolysilicates, monoorganotrialkoxysilanes and monoorganotriaryloxysilanes and condensation products of such silanes, alkyl esters of $HSiCl_3$ and $CH_3HSiCl_2$, and siloxane polymers of $CH_3HSiO$ units particularly cyclic siloxanes such as $(CH_3HSiO)_m$ where $m$ is 3 to 8, alkyl- and aryltitanates, aluminum alcoholates and esters of boric acid. Specific examples of effective cross linking agents include tetraethylsilicate, ethylpolysilicate, hexabutoxydisiloxane, methyltriethoxysilane, phenyltripropoxysilane, phenylsilane triol, triethoxysilane, tetraethoxydisiloxane, methyldibutoxysilane, tetramethylcyclotetrasiloxane $(CH_3HSiO)_4$, tetrabutyltitanate, polymeric butyltitanate, aluminum isopropylate, boric acid triallyl ester and butylmetaborate.

The catalysts employed in this invention include organic and inorganic acids and bases, metal salts of organic acids, metal chelates and organometallic compounds. Specific operable catalysts include stearic acid, trifluoroacetic acid, perchloric acid, dibutylamine, tetramethylammonium hydroxide, piperidine, lead octoate, tin ricinoleate, cobalt hexoate, aluminum acetyl acetonate, zirconium acetoacetate, dibutyl tin dilaurate, dioctyl tin dimaleinate and other dialkyl tin diacylates.

The catalyst and cross linking agent can be employed over wide ranges of proportions. Preferably the cross linking agent is present to the extent of .05 to 20 percent by weight and the condensation catalyst to the extent of .01 to 10 percent by weight based on the weight of the siloxane polymer present in the stock.

The catalyst or cross linking agent or both can be absorbed in a porous aluminum silicate. The absorption in a molecular sieve or molecular cage effectively deactivates the catalyst or cross linking agent. Operable aluminum silicates for this purpose are natural and synthetic aluminum silicates with two- or three-dimensional structure. Preferred are the silicates having three-dimensional structure and particularly natural and synthetic zeolites. Other operable aluminum silicates include permutite, heulandite, natrolite, thomsonite, analcime kaolinite, montmorillonite, bentonite, floridine, commercial clays and bleaching earths such as active bentonite and terrana.

The aluminum silicate will absorb up to 25 percent of its weight of catalyst, cross linking agent or any combination thereof. The silicate itself may act as a filler for the silicone rubber if added in significant quantities. If the silicate is overloaded with catalyst or cross linking agent, a slow room temperature cure will occur, thus it is important not to overload the silicate. Practical limits for absorption are from .1 to 20% by weight of the weight of the silicate.

The siloxane polymer, filler, and additives can be mixed and milled in the normal manner. The cross linking agent and curing catalyst or either one of them can then be added in the deactivated form absorbed in the molecular sieve.

Either the cross linking agent or the curing catalyst can be added per se so long as the other one is added as absorbed in the molecular sieve. Thus although the stock is complete and contains both the cross linking agent and the curing catalyst, it will not vulcanize at room temperature and it can be stored, shipped and used with practically no time limitation.

The stocks are vulcanized simply by forcing the cross linking agent and catalyst from the molecular sieve. This can be done by heating the stock. At a threshold temperature of about 50° C. the cross linking agent and catalyst are liberated from the aluminum silicate and the desired vulcanization is initiated. Generally, temperatures of from 60° C. to 200° C. are employed. Higher temperatures bring about more rapid vulcanization. It is advisable to determine the optimum vulcanization temperature for each stock because different cross linking agent-curing catalyst combinations have different temperatures at which vulcanization is attained at a reasonable rate and satisfactory silicone elastomers are obtained.

The cross linking agent and curing catalyst can also be displaced from the molecular sieve and vulcanization effected by incorporating stronger polar materials into the siloxane rubber stock containing them. Polar fluids including water, alcohols, nitriles and similar materials can be stirred into the silicone rubber stock and will displace the cross linking agent and curing catalyst from the molecular sieve thus effecting vulcanization of the stock at room temperature. This vulcanization can be accelerated by heating the stock. It is apparent that moisture from the air will drive the cross linking agent and curing catalyst from the molecular sieve and vulcanization can occur spontaneously.

When it is desired to employ heat to bring about the vulcanization, it is advisable to place a hydrophobic protective coating on the aluminum silicate immediately after the cross linking agent and the catalyst have been absorbed. The desired hydrophobic coating can be obtained by treating the material with a triorganosilyl endblocked diorganosiloxane oil. Alternatively, hydroxyl endblocked silicone oils, paraffin oils, softeners and so forth can be used to protect the molecular sieve from moisture penetration. It has been found that an easily handled paste can be prepared by mixing about equal amounts of the aluminum silicate with absorbed catalyst or cross linking agent and the hydrophobing oil. The hydrophobic coating serves to avoid vulcanization brought about by water vapor in the atmosphere.

The following examples are included to aid in understanding and practicing this invention. The scope of the invention is delineated in the claims and is not limited by these examples. All viscosities in the examples were measured at 25° C. and all parts and percentages were based on weight unless otherwise expressed.

EXAMPLE 1

*Silicone Rubber Stock A*

A hydroxyl endblocked dimethylsiloxane polymer (100 g.) with a viscosity of 25,000 cs. and 100 g. of quartz flour were mixed in a high speed mill. A mixture (40 g.) of 20 g. of trimethyl endblocked dimethylsiloxane polymer of less than 200 cs. viscosity and 20 g. of a commercial synthetic zeolite having absorbed therein 10% of a 50:50 mixture of tetraethyl silicate $[Si(OC_2H_5)_4]$ and dibutyl tin dilaurate was added to the polymer-filler mixture and was thoroughly dispersed therein. The stock was sheeted out, placed in a mold and vulcanized at 150° C. for 15 minutes. The resulting rubber was tested and found to have a tensile strength at break of 569 p.s.i., elongation at break of 2000 percent and a shore hardness of 45. The vulcanized rubber sheet was further cured at 300° C. for 100 hours after which it had a tensile strength of 682 p.s.i. and elongation at break of 170 percent.

A control stock was prepared as above but 2.5 g. benzoyl peroxide was used as the vulcanizing agent in place of the zeolite-ethylorthosilicate-dibutyl tin dilaurate combination. The rubber obtained after vulcanizing at 150° C. for 15 minutes was heat aged at 300° C. for 100 hours and was found to be brittle and creviced.

EXAMPLE 2

A silicone rubber stock was prepared as was Stock A in Example 1 and 2 cc. of water was added to the mixture and finely dispersed therein. A piece of glass cloth was coated with the mixture so obtained. The rubber stock had vulcanized to a tack free elastomer after 2 hours at room temperature.

Similar results were obtained by adding 2 cc. of methanol, ethanol, acetone nitrile or acrylonitrile to the silicone rubber Stock A.

EXAMPLE 3

Silicone rubber Stock A of Example 1 was dissolved in toluene to give a 50 percent solids solution. A sandblasted, grease free piece of sheet iron was sprayed with the solution. A 0.4 mm. coating after solvent evaporation was so deposited. The coated sheet iron was stored for 24 hours at room temperature and the coating had vulcanized to an elastic mass under the influence of atmospheric humidity.

Masonry, paper, textiles, leather and other materials can be given a hydrophobic coating by spraying as described above with solutions of the compositions of this invention.

EXAMPLE 4

A carefully dried montmorillonite (100 g.) was impregnated with a solution of 10 g. of tetramethylcyclotetrasiloxane and 8 g. of lead octoate in 30 cc. of methylene chloride. The solvent was evaporated from the mixture by heating at 100° C. for 2 hours. The catalyst carrier thus prepared was added to an equal weight of trimethylsilyl endblocked dimethylsiloxane polymer having a viscosity of 10,000 cs. and 20 g. of this mixture was added to and dispersed in 150 g. of a mixture of 100 parts hydroxyl endblocked dimethylsiloxane polymer having a molecular weight of about 500,000 and 40 parts fume silica. The rubber stock was thoroughly milled, sheeted and molded at 140° C. for 10 minutes. The resulting rubber had a tensile strength of 1350 p.s.i. and elongation at break of 550 percent.

EXAMPLE 5

A synthetic aluminum silicate was milled in a ball mill to obtain a powder having an average particle size of 2 microns. The powder was dried at 100° C. under vacuum. A mixture of 100 parts of the dried aluminum silicate powder, 11.7 parts hexaethoxydisiloxane, 3.9 parts dibutyl tin dilaurate in anhydrous benzene was prepared. The benzene was then removed by heating at 100° C.

The mixture was further milled with an equal weight of trimethylsiloxy endblocked dimethylsiloxane of 100 cs. viscosity to obtain a paste.

A mixture of 100 parts of hydroxyl endblocked dimethylpolysiloxane of 15,000 cs. viscosity, 50 parts dried diatomaceous earth and 7.5 parts of the paste prepared above was prepared. The mixture was stored in a closed vessel for 3 months and during this storage no crepe ageing or other vulcanization occurred. The mixture was vulcanized by heating at 120° C. for 15 minutes to an elastomer having tensile strength of 569 p.s.i. and an elongation at break of 175 percent. A glass plate was coated with the mixture and the coating vulcanized to an adherent elastomeric film after 6 hours' exposure to atmospheric humidity.

EXAMPLE 6

When the following polymers were substituted for the hydroxyl endblocked dimethylsiloxane polymer of silicone rubber Stock A, equivalent stocks exhibiting equivalent properties were obtained: (a) a methoxy endblocked dimethylsiloxane polymer of 50,000 cs.; (b) an ethoxy endblocked copolymeric gum of 80 mol percent dimethylsiloxane units and 20 mol percent phenylmethylsiloxane units; (c) a hydroxy endblocked 30,000 cs. copolymer of 90 mol percent dimethylsiloxane units, 9.5 mol percent diphenylsiloxane units and 0.5 mol percent methylvinylsiloxane units; and (d) an ethoxy endblocked siloxane copolymer of 20,000 cs. viscosity and containing 75 mol percent dimethylsiloxane units, 15 mol percent 3,3,3-trifluoropropylmethylsiloxane units, 5 mol percent chlorophenylmethylsiloxane units and 5 mol percent chlorofluoroethylmethylsiloxane units.

EXAMPLE 7

When silicone rubber stocks are prepared in accordance with Example 4 employing in place of the fume silica an equivalent weight of carbon black, titanium dioxide, glass frit, asbestos flour or cork powder, the resulting stocks are equivalent to those obtained in Example 4.

EXAMPLE 8

When the method of Example 4 was repeated employing ethylpolysilicate, $HSi(OC_2H_5)_3$, $CH_3SiH(OCH_3)_2$, tetrabutyl titanate, aluminum isopropylate or butyl metaborate as the cross linking agent in place of the tetramethylcyclotetrasiloxane, the resulting silicone rubber stocks were equivalent to those of Example 4.

EXAMPLE 9

When the method of preparing silicone rubber Stock A of Example 1 was repeated employing as curing catalysts any one of stearic acid, trifluoroacetic acid, dibutylamine, piperidine, tin ricinoleate, cobalt hexoate, aluminum acetylacetate, dioctyl tin dimaleinate and zirconium acetoacetate, the results achieved were equivalent to those observed for silicone rubber Stock A.

That which is claimed is:

1. A silicone rubber stock consisting essentially of (1) 100 parts by weight of an organosiloxane polymer of the general formula $XO(R_2SiO)_nX$ where each X is selected from the group consisting of alkyl radicals and the hydrogen atom, each R is selected from the group consisting of alkyl radicals, aryl radicals, alkenyl radicals, halogenated alkyl radicals and halogented aryl radicals and n has a value of at least 50, (2) 20 to 200 parts by weight of a filler selected from the group consisting of silicas, carbon blacks, quartz flour, asbestos flour, mica flour, calcium carbonate, titanium dioxide, zinc oxide, magnesium oxide, iron oxide, glass frit, cork powder and sawdust, (3) .05 to 20 parts by weight of a crosslinking agent selected from the group consisting of tetraalkoxysilanes, tetraaryloxysilanes, alkylpolysilicates, arylpolysilicates, alkyltrialkoxysilanes, trialkoxysilanes, alkyldialkoxysilanes, methylhydrogensiloxanes, alkyltitanates, aryltitanates, aluminum alcoholates and esters of boric acid, and (4) .01 to 10 parts by weight of a curing catalyst selected from the group consisting of stearic acid, trifluoroacetic acid, perchloric acid, dibutylamine, tetramethylammonium hydroxide, piperidine, lead octoate, tin ricinoleate, cobalt hexoate, aluminum acetyl acetonate, zirconium acetoacetate, and dialkyl tin diacylates and (5) an aluminum silicate molecular sieve, substantially all of at least one of the cross-linking agent (3) and the curing catalyst (4) being absorbed within the aluminum silicate.

2. The rubber stock of claim 1 wherein the crosslinking agent (3) is an ethyl silicate and the curing catalyst (4) is dibutyl tin dilaurate.

3. A silicone rubber stock comprising a hydroxy endblocked dimethylpolysiloxane, a silica filler, methylhydrogencyclosiloxane of the formula $[CH_3HSiO]_m$ where $m$ is an integer greater than 2 and less than 9, and dialkyl tin diacylate characterized in that substantially all of the methylhydrogencyclosiloxane and substantially all of the dialkyl tin diacylate are absorbed in an aluminum silicate molecular sieve.

References Cited in the file of this patent

UNITED STATES PATENTS

| 2,843,555 | Berridge | July 15, 1958 |
| 2,897,869 | Polmanteer | Aug. 4, 1959 |
| 2,902,467 | Chipman | Sept. 1, 1959 |

FOREIGN PATENTS

| 563,517 | Belgium | Jan. 15, 1958 |
| 216,878 | Australia | Aug. 29, 1958 |
| 1,044,400 | Germany | Nov. 20, 1958 |

OTHER REFERENCES

Linde (Union Carbide Corp.), "Chemically Loaded Molecular Sieves," July 1, 1959, 6 pages text, 2 pages cover letters (giving date).